July 27, 1965   J. CHRISTOFFERSON   3,197,161
MOUNTING APPARATUS FOR LARGE EQUIPMENT
Filed Jan. 2, 1963
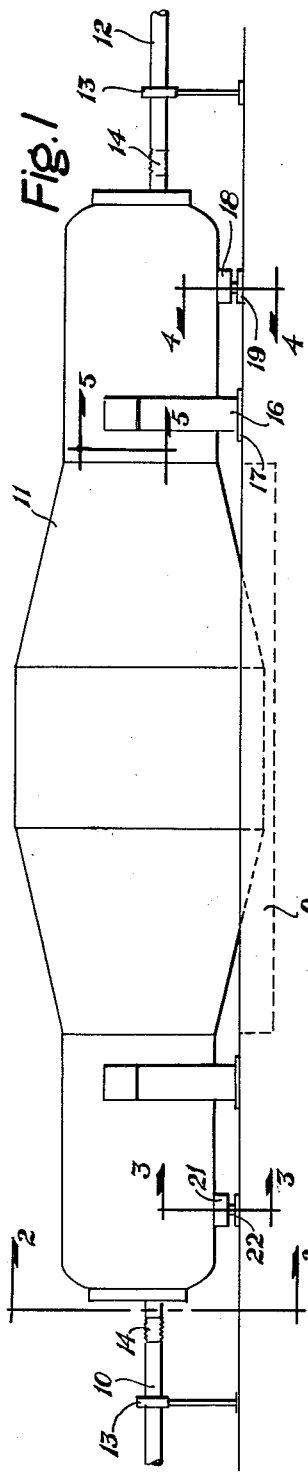
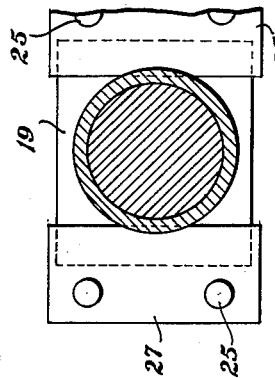
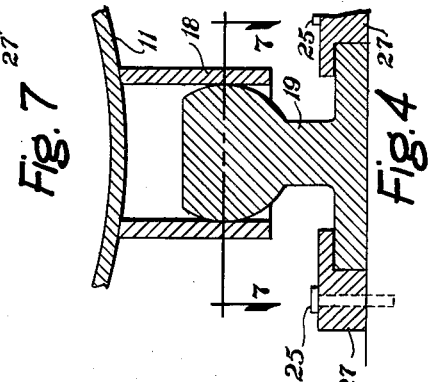
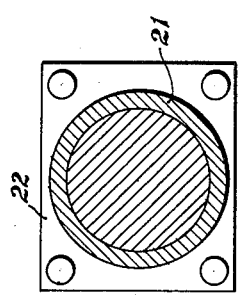
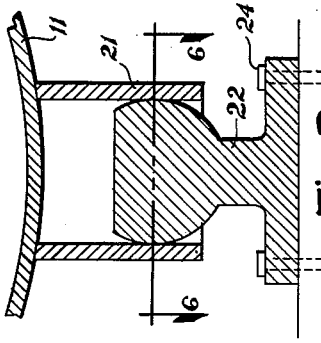
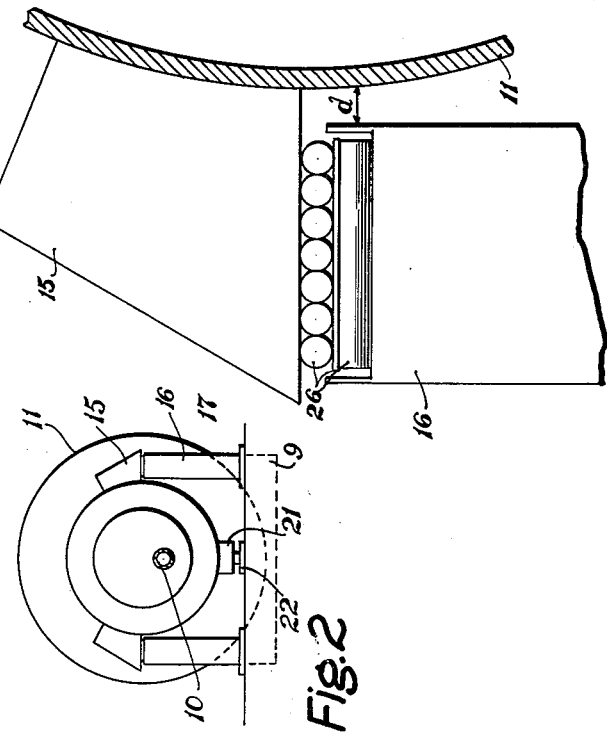

United States Patent Office 3,197,161
Patented July 27, 1965

3,197,161
MOUNTING APPARATUS FOR LARGE
EQUIPMENT
James Christofferson, West Newbury, Mass., assignor to
High Voltage Engineering Corporation, Burlington,
Mass., a corporation of Massachusetts
Filed Jan. 2, 1963, Ser. No. 249,067
1 Claim. (Cl. 248—2)

This invention relates to the mounting of large horizontally disposed machines and the like, and more particularly to mounting apparatus adapted to substantially eliminate the expansion and contraction dislocations of such a machine due to temperature changes.

It is often desirable that at least one major axis of a large electrical or mechanical machine be kept in constant alignment with some fixed reference. This is especially true with respect to the so-called Van de Graaff tandem particle accelerator wherein a charged particle beam is directed through the device under conditions which demand extremely close tolerance. While the present invention will be hereinafter described in conjunction with a particle accelerator of this type, it is not intended that any limitation as to scope or application of the novel concepts disclosed be inferred therefrom. It will be readily apparent to those skilled in the art that the mounting apparatus described herein will be equally applicable to a variety of devices.

Equipment of the class comprehended by this invention is often enclosed in a metal casing which, in some instances, may be as much as one hundred feet in length. Inasmuch as the overall length of such a device will expand or contract in the order of inches over a given temperature range, it is impossible to assure constant alignment by means of bolting the equipment to the floor or foundation. The great weight of these machines combined with the expansion or contraction force would, of course, readily sheer off the bolts. While it is possible to make the bolt holes appreciably larger than the bolt diameters, thereby allowing for some degree of expansion or contraction, such a solution has proved unsatisfactory where accurate alignment is required. This is so because the frictional resistance at all points of contact will not be the same, resulting in expansion or contraction in the direction of the least resistance. Thus, if a machine is bolted at each of four corners, and the frictional resistance at two common (as opposed to diagonal) corners is greater than that at the two opposing corners, the machine would expand in the direction of the opposing corners with the edge of the machine secured at the first mentioned corners remaining in a fixed position relative to the foundation. It follows then that the major axis of the machine would then be displaced in the direction of expansion. Should a single corner, or diagonal corners be more firmly secured than the remaining corners, expansion or contraction of the machine could cause its major axis to become askewed. It is apparent that in a device such as the Van de Graaff tandem accelerator, it would take very little of this type of misalignment to cause a projection charged particle beam to strike the beam tube wall. In addition to possible misalignment resulting from expansion and contraction in the horizontal plane, it is pointed out that such expansion and contraction also varies the girth of the machine. Accordingly, then, if a machine is secured to the foundation or floor surface, the major axis is raised and lowered with expansion and contraction.

Therefore, it is a principal object of this invention to provide means for mounting large equipment whereby alignment of a major axis thereof is fixed and substantially unaffected by the temperature expansions and contractions of the equipment.

It is another object of this invention to provide large machine mounting apparatus adapted to maintain the machine in spaced relationship to its foundation and in constant alignment with a fixed reference line.

These, together with other objects and features of this invention will become more readily apparent from the following detailed description of one presently preferred embodiment thereof taken in conjunction with the accompanying drawings wherein:

FIGURE 1 illustrates in elevation a Van de Graaff tandem particle accelerator in combination with the novel mounting means of this invention;

FIGURE 2 is a sectional view of FIGURE 1 taken at 2—2;

FIGURE 3 is a sectional view of the machine positioning member of the mounting apparatus taken at 3—3 of FIGURE 1;

FIGURE 4 is a sectional view of the machine guide member of the mounting apparatus taken at 4—4 of FIGURE 1;

FIGURE 5 is a partial section of FIGURE 1 taken at 5—5 illustrating the machine supporting means;

FIGURE 6 is a section of FIGURE 3 taken at 6—6; and

FIGURE 7 is a section of FIGURE 4 taken at 7—7.

Referring now to FIGURES 1 and 2, there is illustrated thereby a Van de Graaff tandem particle accelerator 11 connected to low-energy charged particle beam input tube 10 and high energy charged particle beam output tube 12 through bellows means 14. Beam tube positioning members 13 maintain beam tubes 10 and 12 in fixed position. Inasmuch as the beam tube system must be maintained at a high degree of vacuum, bellows means 14 are provided to permit longitudinal movement between the particle accelerator and the fixed position beam tubes. In accordance with the present invention, particle accelerator 11 is supported off the floor by means of accelerator support columns 16 and accelerator flanges 15. Because of the great weight of accelerator 11, support columns 16 are provided with foundation pads 17. A pit 9 is provided under the accelerator to facilitate maintenance.

Having particular reference now to FIGURE 5, it is noted that the bottom surface of flange 15 is substantially aligned with a horizontal plane passing through the center of the accelerator. Support columns 16 are positioned from the edge of accelerator 11 a distance that is sufficient to permit the accelerator to expand without coming in contact with the column. Finally, the top surface of the support columns are provided with friction reducing means such as the roller bearings 26 illustrated in FIGURE 5. An examination of FIGURE 2, now, readily reveals that this arrangement will permit radial expansion or contraction of the accelerator without realignment of the longitudinal axis of the machine. That is, expansion of the lower portion of the accelerator will not raise the longitudinal axis with respect to the fixed position beam tubes because the accelerator is supported off the floor and has room to expand in all directions. Also, the reduced friction between support columns 16 and flanges 15 provide for unrestricted expansion in the horizontal plane.

The particle accelerator 11 is restrained from movement in the horizontal plane at one end by the machine positioning member illustrated in FIGURES 3 and 6. The machine positioning member comprises annular member 21, which is secured to the bottom of accelerator 11 as shown, and vertical connecting member 22 which is secured to the floor or foundation by means of bolts 24. The upper portion of vertical connecting member 22 is hemispheric in shape and arranged to slideably engage the aperture of annular member 21. The positioning member thus prevents both lateral and longitudinal movement of one end of the accelerator while still permitting unrestricted radial expansion.

The other end of accelerator 11 is restricted from lateral movement in the horizontal plane by means of the machine guide member illustrated in FIGURES 4 and 7. The machine guide member comprises annular member 18 which is secured to the bottom of the accelerator, vertical connecting member 19, and guide members 27 which are secured to the floor or foundation by means of bolts 25. Vertical connecting member 19 the top portion of which may be hemispheric in shape, is slideably engaged within the aperture of annular member 18 and the bottom flanged portion thereof is slideably engaged within guide members 27 so as to restrict any lateral displacement of the machine while permitting both longitudinal and radial expansion.

The various components of the mounting means comprehended by this invention and described above co-act in the following manner. The flange members and support columns in slideable relationship maintain the accelerator in space and permit radial expansion without misaligning contact with foundation or support members. The machine positioning member anchors the accelerator in the horizontal plane without restricting radial expansion. The machine guide member restricts lateral movement of the machine while allowing it to expand longitudinally from its anchored reference point at the machine positioning member. It is seen therefore that in combination, these components effectively orient the major longitudinal axis of the accelerator in a fixed position while at the same time permitting any degree of temperature expansion or contraction.

While the present invention has been described with respect to specific apparatus, it is not intended to in any way be limited thereto, the same being by way of example only. Since various other modifications and applications of the invention will occur to those skilled in the art, it is pointed out that the scope thereof is to be limited by the appended claim only.

I claim:

In combination, a large horizontally disposed machine having a metal casing, said metal casing being circular in section normal to the major axis thereof, and a mounting arrangement adapted to compensate for expansion and contraction dislocation of said machine due to temperature changes, said mounting arrangement comprising a plurality of flange members fixedly attached to the sides of said metal casing, a plurality of support columns fixedly attached to a foundation and cooperating with said flange members to support said machine in free space, said flange members and said support columns interacting in approximately the horizontal plane which passes through the major axis of said metal casing, friction reducing means disposed between said columns and flange members adapted to facilitate horizontal expansive and contractive movement of said machine, a first vertically disposed annular member fixedly attached to the bottom of one end of said machine, a first vertical connecting member having one end thereof slideably engaged in the aperture of said annular member and the other end in fixed relationship to said support columns, a second vertically disposed annular member fixedly attached to the bottom of the other end of said machine, longitudinally disposed guide means associated therewith in fixed relationship to said support columns, and a second vertical connecting member, said member having one end thereof slideably engaged in the aperture of said second annular member and the other end thereof in slideable relationship with said guide means.

References Cited by the Examiner

UNITED STATES PATENTS

| | | | |
|---|---|---|---|
| 1,634,084 | 6/27 | Ruths | 248—146 X |
| 1,814,626 | 7/31 | Allen | 248—19 X |
| 2,375,442 | 5/45 | Sandberg | 248—146 X |
| 2,839,260 | 6/58 | Jacobi | 248—146 |

CLAUDE A. LE ROY, *Primary Examiner.*